Sept. 23, 1969   E. WINSTON ET AL   3,468,577

QUICK OPENING LATCH AND CLAMP

Filed Sept. 15, 1967

INVENTORS
ERIC WINSTON
JOHN T. MAZERKA

BY Hopgood & Calimafde
ATTORNEYS

United States Patent Office 3,468,577
Patented Sept. 23, 1969

3,468,577
QUICK OPENING LATCH AND CLAMP
Eric Winston, Melrose Park, and John T. Mazerka, Philadelphia, Pa., assignors to Jerrold Electronics Corporation, Hatboro, Pa., a corporation of Delaware
Filed Sept. 15, 1967, Ser. No. 668,009
Int. Cl. B65d 45/16; A47j 36/10
U.S. Cl. 292—256.75                6 Claims

ABSTRACT OF THE DISCLOSURE

A three piece C-shaped clamp to engage the mating flanges of an associated enclosure. The base of the clamp is pivotally mounted on one half of its enclosure, permitting the clamp to pivot into and out of locking position. The top of the clamp is bolted to the base and engages the other half of the enclosure. Interacting mating surface between the clamp top and base act to position the clamp when tightened, so that only a one half turn of the bolt is sufficient to open or close the enclosure. A shoulder on the clamp base relieves the pivot mounting of all closing forces.

Background

The invention is in the field of two-part bolt-operated clamps operative to hold together two or more cooperating elements. The novel clamp has particular utility in applications where it is important to open and close the clamp with a minimum of hand and tool operations; e.g. a box mounted high on a pole.

Prior art clamps for sealing such boxes included nuts and bolts and clamps of the toggle type. The simple nut and bolt clamp required substantial effort and time in removing the bolt from the nut (and, of course, the converse) when operating at pole heights. The toggle-type clamps are simpler to operate but require more action to open and close than the instant invention, and in addition require slotted receiving members which are subject to wear and damage.

Summary of the invention

The invention is a three piece C-shaped clamp for use with a box-type enclosure provided with mating flanges upon which the clamp acts. The base of the clamp is pivotally mounted to the bottom of the box, and abuts the underside of its flange as the clamp is engaged and tightened. The top of the clamp is bolted to the base, and is guided into desired engagement with the lid flange by cam interaction with the base element. A one-half turn of the bolt is sufficient to unseal the box and permit the clamp to be pivoted clear of the lid. A shoulder on the clamp base abuts the enclosure to support the disengaged clamp in position from which it may be readily re-engaged.

The enclosure is preferably provided with hinges along one edge opposite some of the retaining clamps. The hinges are adjusted so that the clamp edge of the box is biased normally slightly open. A resilient gasket between the mating flanges of the box can be utilized to aid in providing this opening bias. The normally biased open condition is used advantageously in the securing operation of the clamp. It is recalled that a primary objective of the invention is to provide a clamp which is extremely simple to open and close. The normally open biased condition serves as a spring to retain the clamp in position when it is swivelled over the cover. Thus, the technican may easily tighten the clamp by operating a tool with one hand.

The clamp is designed to press the base and cover of the box together in a manner that relieves its swivel mounting from locking pressures. When tightened, the parts of the clamp are so aligned that no transverse forces are applied to its locking bolt. The closing forces are borne directly by the two opposing parts of the clamp engaging the flanges of the enclosure.

Other objects and various further features of novelty and invention will be pointed out or will occur to those skilled in the art from a reading of the following drawings.

Brief description of the drawings

In the drawings, which show, for illustrative purposes ony, a preferred form of the invention:

Referring now to FIG. 1, the clamps of the invention are illustrated disposed about the opening sides of a utility box. The number of clamps so employed is largely a matter of choice, but depends upon the size of the box and the degree of security desired.

FIG. 2 is a side elevation of the clamp in the locked position. The base 1 of the C-shaped clamp is attached to the box 20 by means of flanges 2 and hinge pin 3. The flanges 2 are disposed normal to the bottom of box 20 and are attached to said bottom and flange 21 protruding therefrom. The top 4 of the clamp is attached to the base by bolt 5 which rides through the top 4 and threads into the base 1. Extending from top 4 towards the box 20 is arm 6. Arm 6 cooperates with flange 22 on the top of box 20 to draw the top into locked position. It can be further observed from FIG. 2 that the surface of base 1 adjacent to flange 21 is machined to match and abut against the bottom of flange 21 when the clamp is in the locking position. It is this feature of the clamp that relieves the retaining flanges of any forces created by the tightening of the clamp. In addition, the wedge or cam protrusion 7 of the back of base 1 extends substantially above the mating surface 8 forming the boundary between the elements 1 and 4 of the clamp.

As illustrated in FIG. 3, the wedge extends laterally the entire width of the clamp. The top of the clamp is shaped to receive the wedge-shaped portion 7 of the base, including channel 9 configured to match the cammed upper surface of wedge 7. Elements 7 and 9 as described cooperate as the bolt 5 is tightened to guide the top 4 into precise alignment with the base 1. In addition, as bolt 5 is tightened and clamp top 4 is drawn onto the base 1, the cam surface 9 will ride down the cam surface 7 generating a force simultaneously tending to push arm 6 down on flange 22 and lift the base 1 into contact with flange 21. This wedge cam configuration also provides a degree of play in the clamp when loose to facilitate placing the arm 6 into contact with flange 22, yet assures that upon tightening, the base 1 will abut against flange 21. It should be further noted that retaining arm 6 runs the full width of clamp top 4 and is curved down along the edge of contact with flange 22. Flange 22 is, therefore, hollowed to receive this curved portion of retaining arm 6. This cooperating relationship enables imposition of closing forces which tend to urge the clamp toward the box, which are generated by the action of wedge element 7 and cam surface 9.

FIG. 3 is a back view of the clamp. The hinge flanges 2 are seen disposed on either side of the clamp and the extension of wedge element 7 and channel 9 across the back of the clamp element is evident.

FIG. 4 illustrates the relative positions of the parts of the clamp and an associated enclosure when the clamp is disengaged. One-half turn of bolt 5 is sufficient to permit the ridge 11 on arm 6 to be raised over lip 12 on flange 22. After disengagement, the clamp is retained in a position poised for closure by the stop action of ledge 13 acting against the side 23 of enclosure 20.

Figure 1:
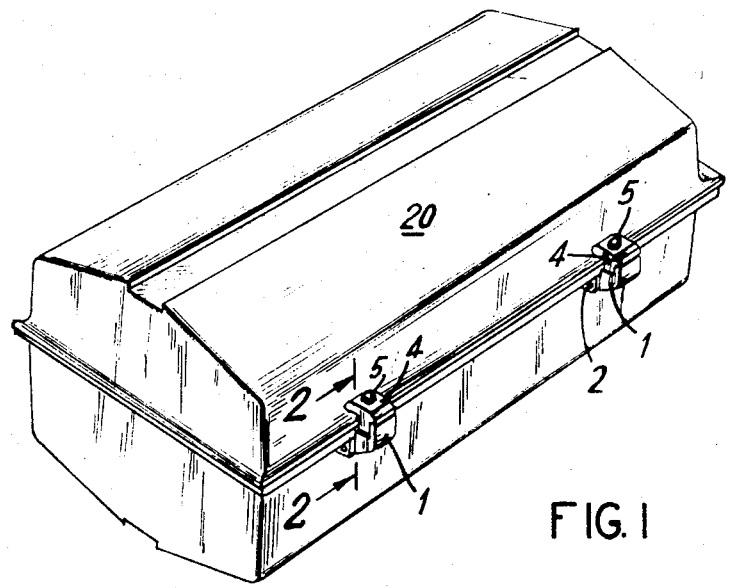
FIG. 1 is a perspective view of an equipment box embodying the clamps of the invention.
Figure 2:
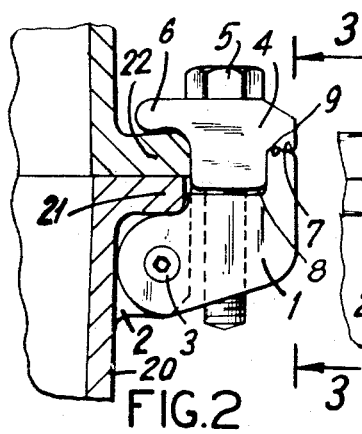
FIG. 2 is a partial cross section of the box of FIG. 1 taken along line 2—2 presenting a side view of the clamp.
Figure 3:
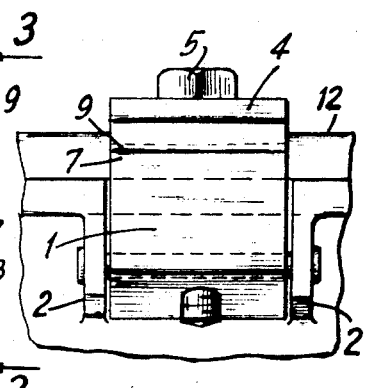
FIG. 3 is a back view of the clamp of FIG. 2 taken along line 3—3 thereof.

The freedom given the clamp 1 by backing off bolt 5 one-half turn permits the head 4 to be lifted from base 1 and cam 7 and tilted slightly away from the box.

From this position, the clamp 1 can be re-engaged by simply pivoting it toward the box 20. As the ridge 11 approaches flange 22 it will ride up and over lip 12 and be retained thereby. This holding action permits loosening, disengagement, re-engagement and locking by a minimum of effort and with one hand.

Figure 4:
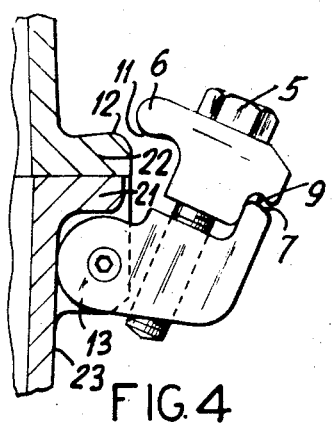
FIG. 4 illustrates the clamp of FIG. 2 in the disengaged position.
Figure 5:
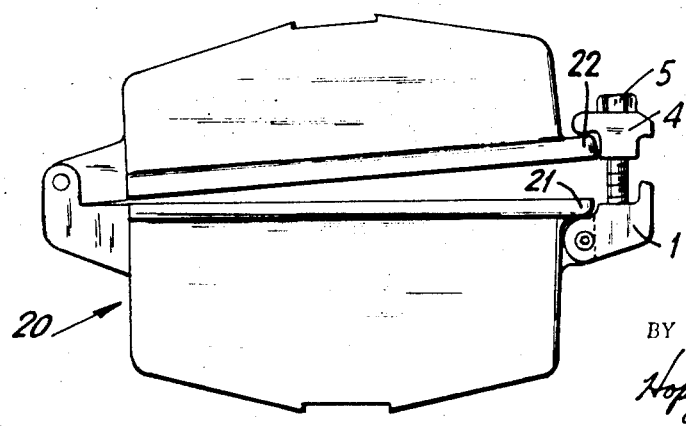
FIG. 5 illustrates the clamp engaged upon a partially opened enclosure.

FIG. 5 illustrates the clamp in the engaged but unlocked position. It is anticipated that the box 20 will be so hinged that it will tend to spring open slightly, as illustrated, when bolt 5 is loosened. In this event, it is apparent that the clamp will remain engaged and held in position for locking. The advantages of this feature to an operator on a utility pole are obvious. In order to seal the box, the clamp need only be positioned as in FIG. 4 and the bolt 5 rotated one-half turn.

While the principles of the invention have been described in connection with the above specific apparatus, it is to be clearly understood that this description is made only by way of example and not as a limitation to the scope of the invention.

What is claimed is:

1. In combination, a housing and a cover therefor, and a clamp to hold said cover tightly upon said housing; said clamp comprising:
   a base swivelly attached to said housing, and a substantially T-shaped top attached to said base,
   bolt means to draw said base and said top together, said bolt means passing through said top and the vertical leg of said T-shaped top,
   said T-shaped top having a first arm which comprises means to engage said cover and a second arm extending on the opposite side of said bolt means from said first arm,
   said base having a vertical projection extending therefrom for contact with said second arm,
   said second arm and said projection comprising cam and cam follower means to vertically and horizontally align said top and base, and said projection further comprising fulcrum means to support said second arm when said first arm is drawn against said cover by the tightening of said bolt means, and thereby preventing the formation of bending moments about said bolt means.

2. The clamp of claim 1 wherein said cam means is comprised of a wall integral said clamp base extending parallel to said bolt means,
   said wall having an outer edge running parallel to the adjacent edge of said housing,
   said outer edge comprising a beveled ridge, and wherein said cam follower is comprised of said second arm, said second arm having an angular channel adapted to receive said beveled ridge when said clamp top is aligned as desired upon said clamp base.

3. The clamp of claim 2 wherein said first arm has a ridge protruding therefrom in the direction of the cover of said housing, and said cover has a mating recess therein for receiving said ridge.

4. An enclosure comprised of a housing,
   a cover for said housing,
   and hinges attaching said cover to said housing,
   a C-shaped clamp swivelly attached to said housing for interruptable engagement with said cover, said clamp having an arm which engages said cover in opposition to the opening thereof when said clamp is swivelled into the engaging position,
   means to bias said cover into a partially opened position, and against said arm when engaged,
   said arm having a ridge on an end thereof and said cover having a recess therein positioned to receive said ridge,
   said protrusion and recess comprising means to retain said arm in the engaged position upon said cover when so biased into the partially opened position.

5. The device of claim 4 wherein said clamp base includes abutment means which cooperate with a side of said housing to retain said clamp in close proximity to said cover, so that a slight pivoting of said clamp toward said enclosure will cause said arm to engage said cover.

6. A C-shaped clamp comprised of a base and a substantially T-shaped top, said clamp having a bore running vertically therethrough, and bolt means extending through said bore to urge said base and top together,
   said T-shaped top having a first engaging arm and a second arm extending on the opposite side of said bolt means from said first arm,
   said base comprising a cam and said second arm comprising a cam follower,
   said cam having a first portion extending parallel to said bore to maintain said base and top in rotational alignment, and a second portion extending generally laterally to said bore to otherwise position said clamp top as desired upon said base as said clamp is tightened.

References Cited

UNITED STATES PATENTS

| 1,008,146 | 11/1911 | Herriman | 292—256.5 |
| 1,941,294 | 12/1933 | Eck | 292—256 X |
| 2,162,480 | 6/1939 | Forbes | 292—256 X |
| 2,246,470 | 6/1941 | McArn | 292—256.5 X |

FOREIGN PATENTS

| 121,340 | 12/1918 | Great Britain. |

MARVIN A. CHAMPION, Primary Examiner

E. J. McCARTHY, Assistant Examiner

U.S. Cl. X.R.

220—55